United States Patent
Laroia et al.

(10) Patent No.: US 6,922,388 B1
(45) Date of Patent: Jul. 26, 2005

(54) SIGNAL CONSTRUCTION, DETECTION AND ESTIMATION FOR UPLINK TIMING SYNCHRONIZATION AND ACCESS CONTROL IN A MULTI-ACCESS WIRELESS COMMUNICATION SYSTEM

(75) Inventors: Rajiv Laroia, Basking Ridge, NJ (US); Junyi Li, Matawan, NJ (US); Sundeep Rangan, Hoboken, NJ (US); Sathyadev Venkata Uppala, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/503,041

(22) Filed: Feb. 11, 2000

(51) Int. Cl.[7] .................................. H04J 11/00
(52) U.S. Cl. ........................ 370/208; 370/343
(58) Field of Search ................. 370/370, 371, 370/372, 373, 374, 375, 343, 208, 209, 210, 328, 329, 330, 344, 480; 375/133, 135, 136, 138

(56) References Cited

U.S. PATENT DOCUMENTS

| | | | |
|---|---|---|---|
| 5,430,760 A | | 7/1995 | Dent |
| 5,802,044 A | * | 9/1998 | Baum et al. |
| 5,867,478 A | * | 2/1999 | Baum et al. |
| 5,930,308 A | * | 7/1999 | Schmutz |
| 5,970,047 A | * | 10/1999 | Suzuki |
| 6,038,450 A | | 3/2000 | Brink et al. |
| 6,178,215 B1 | * | 1/2001 | Zhang et al. |
| 6,266,365 B1 | * | 7/2001 | Wang et al. |
| 6,317,412 B1 | * | 11/2001 | Natali et al. ............... 370/208 |
| 6,330,294 B1 | * | 12/2001 | Ansbro et al. |
| 6,359,938 B1 | * | 3/2002 | Keevill et al. |
| 6,449,246 B1 | * | 9/2002 | Barton et al. |
| 6,456,653 B1 | * | 9/2002 | Sayeed |
| 6,546,055 B1 | * | 4/2003 | Schmidl et al. |
| 6,549,561 B2 | * | 4/2003 | Crawford |
| 6,560,209 B1 | * | 5/2003 | Alamouti et al. ............ 370/330 |

FOREIGN PATENT DOCUMENTS

| | | |
|---|---|---|
| EP | 0 760 564 A2 | 3/1997 |
| GB | 2 324 932 A | 4/1998 |
| JP | 11-113049 | 4/1999 |

OTHER PUBLICATIONS

S. Gupta, "Phase–Locked Loops," Proceedings IEEE, vol. 63, pp. 291–306, Feb. 1975.
W. Lindsey and C. Chie, "A survey of digital phase–locked loops," Proceedings IEEE, vol. 69, pp. 410–432, 1981.
L. Franks, "Synchronization subsystems: analysis and design," Digital Communications, Satellite/Earth Station Engineering, K. Feher, ed.,, Prentice–Hall, Englewood Cliffs, NJ, pp. 294–325, 1981.

(Continued)

*Primary Examiner*—Kwang Bin Yao

(57) ABSTRACT

Signal construction, detection and estimation techniques for use in uplink timing synchronization and access control in an orthogonal frequency division multiplexed (OFDM) wireless system or other type of wireless communication system. In accordance with an illustrative embodiment of the invention, timing and access signals to be transmitted in designated timing and access intervals are constructed from orthogonal multitone signals. The multitone signals may be similar to multitone signals used in OFDM data transmission, except that a cyclic prefix associated with reception of the signals in a base station is extended to cover the timing errors of mobile stations not yet synchronized. The invention also provides design techniques which optimize the time resolvability and peak-to-average ratio of the multitone signals, an efficient fast Fourier transform (FFT) based technique for maximum likelihood timing estimation, and a robust linear filtering technique for averaging timing estimates from different synchronizations.

39 Claims, 3 Drawing Sheets

OTHER PUBLICATIONS

H. Meyr and G. Ascheid, "Synchronization in Digital Communications," New York, NY: Wiley Interscience, pp. 21–35, 1990.

J. Proakis, "Digital Communications," New York, NY: McGraw–Hill, 3rd ed., pp. 333–371, 1995.

A.J. Viterbi, "CDMA: Principles of Spread–Spectrum Communications," New York, Addison Wesley, Appendix 3A, pp. 68–75, 1995.

A. V. Oppenheim and R.W. Schafer, Digital Signal Processing, Englewood Cliffs, NJ, Prentice Hall, pp. 238–269, 1975.

J. L. Brenner, "Application of Chebychev Polynomials to Antenna Design," in Topics in Polynomials of One and Several Variables and their Application, T. M. Rassias, H.M. Srinivastava and A. Yanashaukas, editors, World Scientific Publ., pp. 101–108, 1993.

M. Wahlqvist et al., "Time Synchronization in the Uplink of and OFDM System," IEEE, pp. 1569–1573, 1996.

* cited by examiner

SIGNAL CONSTRUCTION, DETECTION AND ESTIMATION FOR UPLINK TIMING SYNCHRONIZATION AND ACCESS CONTROL IN A MULTI-ACCESS WIRELESS COMMUNICATION SYSTEM

RELATED APPLICATION

The present invention is related to the invention described in U.S. patent application Ser. No. 09/503,040, filed concurrently herewith in the name of inventors R. Laroia et al. and entitled "Uplink Timing Synchronization and Access Control for a Multi-Access Wireless Communication System," which is incorporated by reference herein.

FIELD OF THE INVENTION

The present invention relates generally to wireless communication systems and more particularly to techniques for constructing, detecting and estimating signals for use in uplink timing synchronization and access control in a multi-access wireless communication system.

BACKGROUND OF THE INVENTION

Orthogonal frequency division multiplexing (OFDM) has been recently proposed as a multi-access scheme for use in the next generation of cellular wireless systems. A critical issue in the design of these systems is the requirement of strict timing synchronization and access control. In order to maintain orthogonality in the uplink, it is necessary that all signal paths from all mobile stations ("mobiles") arrive within a so-called receive cyclic prefix of the particular base station that they are attempting to communicate with. Moreover, new mobiles that have not yet synchronized must be able to access the base station without disrupting the uplink data from mobiles already in communication and synchronized with the base station.

A need exists for techniques for construction, detection and estimation of the timing and access signals to be used in OFDM uplink synchronization and access systems. The construction, detection and estimation of timing and access signals is a classic problem, and-involves, in general, a number of standard criteria including timing resolvability, signal bandwidth, the power requirement on the mobile to transmit the signals, and estimation optimality. See, e.g., J. G. Proakis, "Digital Communications," $3^{rd}$ ed., New York, McGraw Hill, 1995, which is incorporated by reference herein. However, the design and estimation of signals for certain OFDM multi-access wireless synchronization systems presents a number of unique challenges.

First, the multi-access channel may result in interference between signals. It is desirable to reduce the co-signal interference to improve the signal detection and estimation, and eliminate the need for the computationally difficult procedures such as interference cancellation or multi-user detection and estimation. Also, in wireless systems, signals from different mobiles may be received with widely different powers, and suppression of the co-signal interference is necessary to avoid strong signals from overwhelming weaker ones. This need to suppress co-signal interference is particularly important during access, when new mobiles may not yet be power controlled. Also, when co-signal interference is reduced, mobiles which have failed access can more rapidly increase their transmission power in subsequent access attempts, since the effect of co-signal interference from a high-power mobile is reduced. This potential for faster power increases would reduce the access delay.

Second, in a wireless channel, signal detection and timing estimation should be robust against channel fading, multipath delay spread and any interference appearing in the same band. Moreover, in OFDM systems, the objective of timing estimation is not to resolve all the signal path arrival times. Instead, it is only necessary to determine some timing offset such that all signal paths arrive within the base station cyclic prefix.

Conventional techniques have been unable to address adequately the above-identified concerns relating to the construction, estimation and detection of timing and access signals for synchronization and access control in OFDM systems.

SUMMARY OF THE INVENTION

The present invention provides improved techniques for construction, detection and estimation of timing and access signals in an OFDM system or other type of wireless communication system.

In accordance with one aspect of the invention, a set of timing and access signals are made orthogonal by constructing them from multitone signals. A multitone signal may be, e.g., a linear combination of discrete complex tones, whose baseband tone frequencies are integer multiples of 1/T, where T is the base station sample window size. Each timing and access signal may contain one such multitone signal, with multitone signals in different timing and access signals using non-overlapping tone frequencies.

Advantageously, such multitone timing and access signals are guaranteed to be received orthogonally over the base station receiver sample window, since the distinct tones contained in the signals are orthogonal over any period of length T. Also, since linear channels do not change the tone frequencies, the multitone timing and access signals will be received orthogonally, even when different signals arrive asynchronously through different multipath channels. The orthogonality eliminates the co-signal interference described above, and thereby improves the signal-to-noise ratio, eliminates the need for multi-user detection and estimation, and permits a greater range of receive power levels.

Orthogonality can be maintained under variable arrival times and multipath channels by transmitting each multitone signal for a time, $T_s$, which is larger than the base station sample window size, T. This extra length, $T_s-T$, provides a timing slack, such that even under variable arrival times and multipath dispersion, the base station sample always captures exactly one T-period of the sinusoidal steady-state response to the multitone signal.

Timing errors of mobiles not yet synchronized can be covered by selecting the excess length, $T_s-T$, of the timing and access signals to be larger than that used in OFDM data signals. In addition, guard periods in which there is no transmission can be added at both ends of a given timing and access signal, to prevent the timing and access signals from interfering with data reception outside the timing and access interval.

In one illustrative embodiment of the invention, each timing and access signal contains one multitone signal and the base station captures one T-period of the signal. In another illustrative embodiment, each timing and access signal comprises a sequence of L multitone signals transmitted one after another, and the base station captures one T-period from each of the L multitone signals. The multiple sample format can be used to reduce the peak number of tones transmitted by the mobile at one time, thereby reducing the peak transmit power requirement.

Another aspect of the invention provides techniques for optimizing the tone frequencies and coefficients of the multitone timing and access signals. In accordance with these techniques, tone frequencies and the magnitudes of the complex multitone coefficients can be determined using the criterion of time resolvability, while the phases of the complex coefficients are determined using the criterion of peak-to-average ratio. More particularly, to combat channel fading, the tones of each multitone signal are selected to span a large frequency range for frequency diversity. This diversity may be achieved by constructing each multitone signal of groups of contiguous tones, with the groups separated beyond the channel coherence bandwidth. Finite impulse response (FIR) filter design techniques, such as Chebychev polynomials, may be used to determine coefficient magnitudes of the tones in each contiguous group. The coefficient phases of tones in each multitone signal are then selected to minimize the resultant peak-to-average ratio without affecting the optimized property of time resolvability.

A further aspect of the invention provides a maximum-likelihood (ML) estimator for the base station to estimate the arrival time of the received multitone timing and access signal. In a multipath channel, the ML estimate is the delay that maximizes the sum of the cross-correlation energies of the received signal with certain multipath component of the transmitted signal. The ML estimator can be implemented with standard Inverse Fast Fourier Transform (IFFT) techniques. Also, the received signal power can be estimated by the maximum of the total cross-correlation energy. The presence of a transmitted access signal can be detected when the estimated received signal power surpasses a predetermined energy threshold constant. The ML estimate for the timing and power can be used in the access acknowledgment, if the access can be granted.

In accordance with another aspect of the invention, if timing re-synchronizations are sufficiently frequent, then timing estimates at different synchronizations are combined to improve the estimation accuracy. The combining can be performed by linearly low-pass filtering the timing estimates from the base station. A clipping technique may be used to screen out large and spurious timing errors. Such timing errors can occur due to fading of the timing signal resulting in a poor estimate at the base station, or fading of the feedback channel resulting in a corruption of the feedback timing correction.

DETAILED DESCRIPTION OF THE INVENTION

Figure 1:
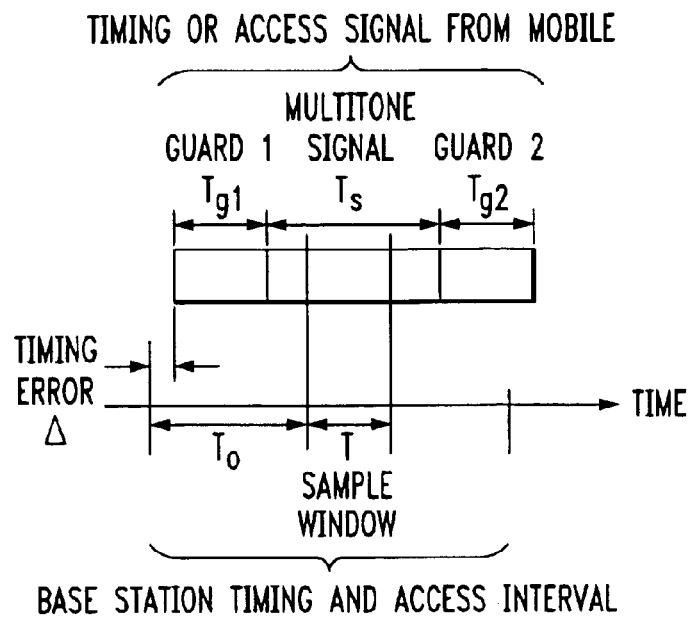
FIG. 1 shows a single sample timing and access signal in accordance with the invention.

The present invention will be illustrated below in conjunction with an exemplary multiple access wireless communication system based on orthogonal frequency division multiplexing (OFDM). It should be understood, however, that the invention is not limited to use with any particular type of wireless communication system.

The above-cited U.S. patent application Ser. No. 09/503, 040 discloses systems for OFDM synchronization and access control in which mobiles transmit certain timing and access signals in dedicated timing and access intervals. In an illustrative embodiment of such a system, the timing and access intervals occur periodically in the uplink stream, and all regular uplink data transmission is suspended during the intervals. For access, new mobiles transmit one of a pre-specified set of access signals during the interval, and the base station searches each interval for the presence of the access signals to detect the access requests. If an access request is detected and granted, the base station can send an access acknowledgment in the downlink containing uplink and downlink channel assignments along with initial timing and power corrections. Similarly, for re-synchronization, mobiles can transmit pre-specified synchronization signals in the timing and access intervals. The base station can measure the arrival times of the signals, and transmits appropriate timing corrections back to the mobiles in the downlink.

Since this illustrative uplink synchronization and access system uses designated intervals completely separate from the uplink data, considerable flexibility is available in signal design, detection and estimation. In particular, timing and access signals can be designed completely differently than regular OFDM data signals.

The present invention provides techniques for construction, detection and estimation of timing and access signals. These techniques are particularly well suited for use in synchronization and access control systems such as those described in the above-cited U.S. Patent Application, but are also applicable to other types of systems.

Multitone Signals

In an illustrative embodiment of the present invention, timing and access signals are constructed from multitone signals. A multitone signal is a linear combination of complex exponentials of the form (in baseband), $$u(t) = \sum_{m=1}^{M} a_m e^{j\omega_m t}, \omega_m = 2\pi n_m / T, t \in [0, T_s] \quad (1)$$

where M is the number of tones, $\alpha_m$ are complex scalars, $\omega_m$ are the tone frequencies and T is the base station sample window size. The indices $n_m$ are each integers from 0 to N−1 where N is the total number of tones available. To utilize the same processing as the data reception, the timing and access window size, T, will be the same as the window size for the OFDM data symbols. The time $T_s$ is the length of the multitone signal and will be greater than T but less than the total length of the timing and access signal. Any signal u(t) of the form (1) is periodic with period T.

A multitone signal can be computed by the mobile using an inverse fast Fourier transform (IFFT) processor which is also used for OFDM data transmission. Alternatively, the signal can be pre-computed and stored in a memory of the mobile.

An important property of the multitone signals in this embodiment is that two multitone signals with non-overlapping sets of tone frequencies are orthogonal over any period of length T. Moreover, the two multitone signals will remain orthogonal even if transmitted over different multipath channels, since the received signals will also be multitone signals with the same tones as the transmitted signals. Consequently, orthogonally received timing and access signals can be easily constructed by using multitone signals with disjoints sets of tones.

By way of example, two illustrative multitone timing and access signal formats will be described below: single sample timing and access signals, and multiple sample timing and access signals.

Single Sample Timing and Access Signals

FIG. 1 shows an example of a single sample timing and access signal in accordance with the invention. The timing and access interval refers to the interval in which the timing and access signals are received. Although the figure only shows one timing and access signal, it should be understood that a number of timing and access signals from different mobiles could be received in the same timing and access interval.

The base station takes one sample window of the total timing and access interval. The sample window has length T, and begins at a time $T_0$ from the beginning of the interval. The total length of the timing and access interval is denoted $T_t$. The single sample timing and access signal itself comprises one multitone signal of length $T_s$ along with guard periods (described below) of length $T_{g1}$ and $T_{g2}$ on both ends. The multitone signal is of the form (1) above. For orthogonality, different timing and access signals use non-overlapping sets of tone frequencies $\omega_1, \ldots, \omega_M$. The selection of the tone frequencies $\omega_m$ and coefficients $\alpha_m$ will be described below. The timing and access signal has the same length as the timing and access interval.

The timing and access signal is shown to arrive with an error, denoted Δ relative to the base station timing and access interval. In general, Δ can be positive or negative. For the proposed signal construction and timing estimation, it is assumed that there are some a priori bounds on the maximum timing error. Before transmitting a timing or access signal, it is assumed that mobiles attain some level of synchronization which is guaranteed to bring the timing error within these bounds. These timing error bounds could be larger than the final desired timing errors, and could be achieved by a known technique, such as open-loop synchronization.

The guard periods of length $T_{g1}$ and $T_{g2}$ as shown in FIG. 1 are periods in which there is no transmission. The guard periods insure that the multitone signal will not corrupt data reception outside the timing and access interval. The lengths $T_{g1}$ and $T_{g2}$ should be sufficiently large to cover the possible range of the timing errors Δ.

The starting point of the sample window, $T_0$, should be selected such that the sample window lies entirely in the $T_s$-length multitone signal for all possible values of Δ. Also, in a channel with maximum delay spread $\delta_{max}$, the sample window should start at least $\delta_{max}$ from the beginning of the multitone signal to insure that the channel comes to the steady-state sinusoidal response before the T-sample window. With this alignment, the base station samples exactly one T-period of the steady-state sinusoidal response of the $T_s$-length multitone signal. Also, $T_0$ can be adjusted, if desired, such that the timing and access sample window is synchronized with the sample windows of the OFDM data symbols.

It can be seen that the mobile must transmit the multitone signal for a time $T_s$ greater than one period T, to cover the unknown timing error Δ and channel delay spread $\delta_{max}$. This is similar to the cyclic prefix used in traditional OFDM. However, this excess length, $T_s-T$, will in general be larger than the cyclic prefix in the OFDM data symbols, since the excess length must cover the timing errors from mobiles not yet synchronized.

Multiple Sample Timing and Access Signals

In certain circumstances, the mobile may have insufficient power to transmit a large number of tones at the same time. To reduce the peak number of tones transmitted, a multiple sample timing and access signal format may be used, in which a number of multitone signals are transmitted sequentially over time.

Figure 2:
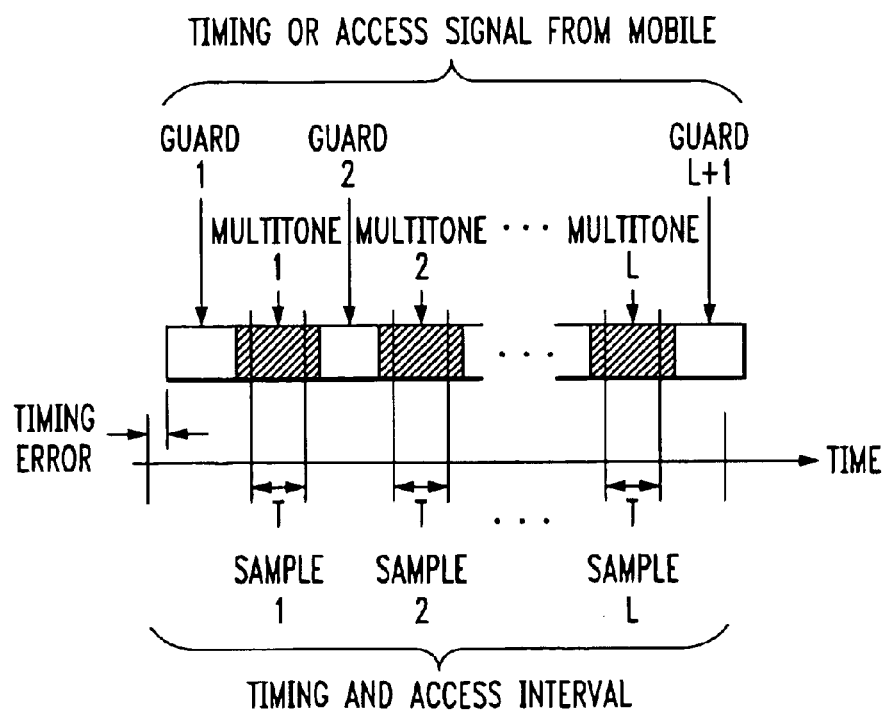
FIG. 2 shows a multiple sample timing and access signal in accordance with the invention.

FIG. 2 shows an example of a multiple sample timing and access signal in accordance with the invention. The timing and access signal comprises a sequence of L multitone signals transmitted one after the other. The base station takes a T-length sample from each of the L multitone signals. As in the single sample case, each of the L multitone signals is of length $T_s$ and of the form (1). In each of the L sample windows, different timing and access signals should use non-overlapping sets of tone frequencies.

As in the single sample signal of FIG. 1, guard periods can be added at the beginning and end of the sequence of multitone signals to protect adjacent data reception. For alignment purposes, guard periods can also be added in between the multitone signals. Also, the L sample windows should be aligned such that they capture one T-period of the steady-state response of each of the L multitone signals.

Single Time Resolvability Optimization

Designing orthogonal multitone synchronization signals of the form (1) involves selecting the number, M, of tones per signal, and, for each signal, selecting the tone frequencies $\omega_m$ and the coefficients, $\alpha_m$. For purposes of illustration, example signal designs will be described herein using time resolvability and peak-to-average ratio as design criteria. It should be noted, however, that a precise evaluation of a timing signal generally requires a detailed simulation with a specific channel model. This section will consider the first of the two above-noted design criteria, namely, time resolvability.

A timing signal generally must be designed such that the delay of the signal's arrival can be estimated easily by the base station. Time resolvability refers to how easy this estimation is in the presence of channel fading and noise.

For simplicity, we first consider the design of multitone signals assuming a single-path channel model. We will then extend the description to the case of multipath channels. In a single-path channel, a mobile transmits a timing signal u(t) and the base station receives a delayed version of the signal, u(t−τ). The base station must estimate the delay τ from the received signal.

For periodic signals u(t) of the form (1), the cyclic sampled autocorrelation of the signal can be used as one simple measure of its time resolvability, i.e., $$R_u(\tau) = \sum_{k=0}^{N-1} u(kT/N)\overline{u}(kT/N - \tau) = \sum_{m=1}^{M} |a_m|^2 e^{j\omega_m \tau} \quad (2)$$

The cyclic autocorrelation $R_u(\tau)$ represents the degree of correlation between the signals u(t) and u(t−τ). If the autocorrelation magnitude $|R_u(\tau)|$ is high, it can be expected that it would be difficult to resolve two delays separated by τ.

This fact can be justified more rigorously by an analysis similar to that described in Appendix 3 of A. J. Viterbi, "CDMA: Principles of Spread-Spectrum Communication," N.Y. Addison Wesley, 1995, which is incorporated by reference herein. Following this analysis, one can compute the minimum probability of error in distinguishing between two delays, $\tau=\tau_1$ and $\tau=\tau_2$ on the basis of noisy, faded measurements of the delayed timing signal $u(t-\tau)$. It can be shown that this minimum error probability increases with the autocorrelation magnitude $|R_u(\tau_1-\tau_2)|$ and decreases with the signal power $|R_u(0)|$.

Consequently, for good time resolvability, it is desirable to have $|R_u(\tau)|$ small for all delay differences $\tau$ to be resolved, and have the signal power, $R_u(0)$; be as large as permitted. That is, it is desirable to have signals with "peaky," or "white-noise like" autocorrelations.

For a given number of tones M, the general problem of selecting the tone frequencies $\omega_m$ and the coefficients $\alpha_m$ to achieve a good autocorrelation $R_u(\tau)$ is difficult. However, the problem is significantly simplified if each timing signal is composed of contiguous tones. That is, one timing signal is constructed from tones 0 to M−1, the second from M to 2M−1, and so on. With contiguous tones, the autocorrelation $R_u(\tau)$ in (2) can be regarded as a frequency response of an M-tap finite impulse response (FIR) filter with positive coefficients $|\alpha_m|^2$. Thus, to create a "peaky" autocorrelation, one can use any standard FIR low-pass filter with positive coefficients.

Suitable FIR filter design techniques are described in, e.g., A. V. Oppenheim and R. W. Schafer, Digital Signal Processing Englewood Cliffs, N.J., Prentice Hall, 1975, which is incorporated by reference herein. One such FIR design technique well suited for multitone signals is based on Chebychev polynomials. The technique is to select the coefficients $\alpha_m$ based on the following min-max optimization: fix a $\delta>0$, and find the coefficients $\alpha_m$ in (1), to minimize, $$\min_{a_1,\ldots,a_M} \max_{\tau \in [\delta,T-\delta]} |R_u(\tau)|, \text{ subject to } R_u(0) = E_{\max} \quad (3)$$

where $E_{max}$ is the maximum allowed signal power. This formulation uniformly minimizes the autocorrelation $|R_u(\tau)|$ over all $\tau \in [\delta, T-\delta]$, and consequently maximizes the resolvability of all relative delays greater than $\delta$. The variable $\delta$ determines the minimum resolvable delay separation and can be adjusted as a design parameter. With M contiguous tones, the solution to (3) is standard and given by a Chebychev filter. The exact equations can be found in, e.g., J. L. Brenner, "Application of Chebychev Polynomials to Antenna Design," in Topics in Polynomials of One and Several Variables and their Application, T. M. Srinivastava and A. Yanashaukas, editors, World Scientific Publ., 1993, which solves a similar problem for multi-antenna design.

The above analysis assumes a single-path channel model. In a multipath channel, it is necessary that the signal arrival time can be estimated in the presence of channel fading. One heuristic technique for combating channel fading is to incorporate some frequency diversity in the tone selection. That is, the tones of each multitone signal should span a large frequency range. In this way, frequency selective fading will only affect a subset of tones in the multitone signal, thus reducing the adverse impact on estimating the signal arrival time.

Unfortunately, while contiguous tone selection allows for easy coefficient design, contiguous tones offer little frequency diversity since the tones are all located close together. A simple way to add frequency diversity is for the multitone signal to be composed of groups of contiguous tones, with the groups separated beyond the channel coherence bandwidth. The coefficients of the tones in each contiguous group can be designed by the FIR and Chebychev techniques described above. In a multiple sample timing and access signal, the different contiguous groups could appear in different sample windows.

Single Peak-to-average Ratio Optimization

In most radio frequency (RF) amplifiers, the power required to transmit a signal is generally determined by the signal's peak value, not its mean square. For a T-periodic signal $u(t)$, we define the peak-to-average ratio (PAR) as $$PAR = \frac{\|u\|_\infty^2}{\|u\|_2^2} \quad (4)$$

where $$\|u\|_\infty^2 := \sup_{t \in [0,T]} |u(t)|^2$$

$$\|u\|_2^2 := \frac{1}{T} \int_0^T |u(t)|^2 dt$$

For all signals, $PAR \geq 1$. Signals with a large PAR require a greater peak power to transmit and therefore necessitate a greater dynamic range in the RF amplifier. Consequently, it is desirable to have the PAR as small (close to one) as possible.

As shown above, the autocorrelation function $|R_u(\tau)|$ in (2) depends only on the coefficient magnitudes $|\alpha_m|$. Thus, it is possible to select the phases of the coefficients $\alpha_m$ to minimize the PAR without affecting the autocorrelation.

To describe the PAR minimization more precisely, write the complex coefficients $\alpha_m = h_m \exp(j\phi_m)$ where $h_m \geq 0$ is the magnitude and $\phi_m$ is the phase. Assume the magnitudes $h_m$ are determined by the time-resolvability optimization described above. The PAR is minimized by adjusting the phases $\phi_m$. The values of $h_m$ fix the norm $\|u\|_2$ in (4), and therefore minimizing the PAR over the phases $\phi_m$ is equivalent to minimizing the peak norm $\|u\|_\infty$. Thus, the PAR minimization can be rewritten as $$\min_{\phi_1,\ldots,\phi_M} \|u\|_\infty = \min_{\phi_1,\ldots,\phi_M} \max_{t \in [0,T]} \left| \sum_{m=1}^M h_m e^{j(\omega_m t + \phi_m)} \right| \quad (5)$$

For moderate size M, the problem can be approximately solved by well-known numerical optimization techniques.

Multipath Timing Estimation and Access Detection

In slotted timing and access systems, it is generally the responsibility of the base station to search each timing and access interval for the presence of the timing and access signals. For each signal detected, the base station must measure the arrival time of the signal relative to some target arrival time, and transmit an appropriate timing correction back to the mobile. This section considers the detection and timing estimation of the multitone signals described above.

For estimation and detection of the multitone signals, a random multipath channel model may be used in conjunction with a corresponding maximum likelihood (ML) estimator. By using a random multipath model, access and detection will be inherently robust against channel variations and channel multipath. Also, ML estimators are known in general to have good statistical properties with respect to estimation error, and therefore should provide accurate detection and estimation. In addition, it will be shown that the ML estimators for the random multipath channel model can be implemented with simple FFT routines.

The multipath channel model and estimation problem can be defined as follows. The channel is assumed to be comprised of a large number of independent randomly fading paths, with random arrival times contained in some interval, $[\tau, \tau+\delta_{max}]$, relative to the beginning of the T-length sample window. For simplicity, we will only describe estimation and detection of single sample multitone signals. The extension to multiple sample signals is straightforward, as will be demonstrated in the example design presented below. The variable $\tau$ represents the first arrival time, and $\delta_{max}$ is the maximum delay spread. We assume the base station knows, a priori, the delay spread, $\delta_{max}$, and an average channel power-delay profile, $p(t)$, for $t \in [0, \delta_{max}]$. The first arrival time, $\tau$, is, however, not known.

The problem for the base station is to estimate this first arrival time, $\tau$. Estimating $\tau$ will locate the range of signal arrival times from the mobile. With the range of arrival times known, the base station can send a timing correction to the mobile which will insure that, after applying the correction, all signal paths from the mobile will arrive within the base station cyclic prefix.

We will assume the unknown first arrival time, $\tau$, is bounded in the interval, $\tau \in [0, T]$. Since the multitone signals are T-periodic, the arrival time of the signal can only be determined up to multiples of T. The assumption $\tau \in [0, T]$ restricts $\tau$ to one T-period interval making the arrival time unambiguous.

For the random multipath channel model, it can be shown that the ML estimator is given by a summation of standard time-domain correlations.

Figure 3:
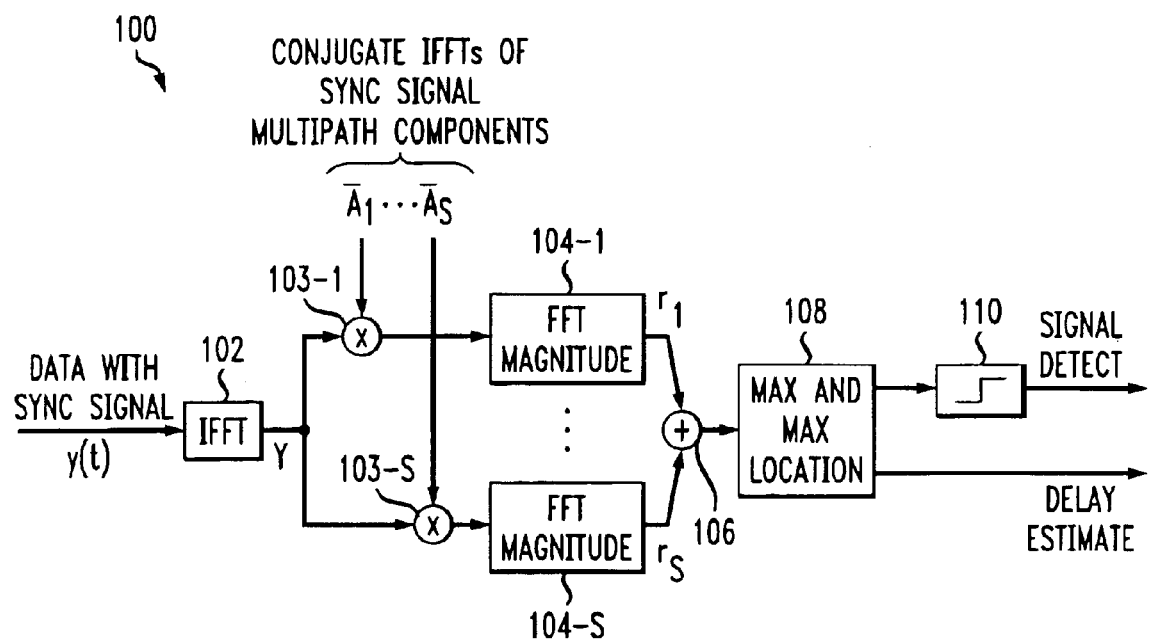
FIG. 3 shows an illustrative embodiment of a base station multipath detection and timing estimation system in accordance with the invention.

FIG. 3 shows an illustrative embodiment of a multipath detection and timing estimation system 100 in accordance with the invention. The system 100 is an approximate FFT-based implementation of the above-described ML estimator, and is implemented within a base station of an OFDM system. Assume the base station is to detect the presence, and estimate the timing, of a multitone signal u(t) of the form (1). The coefficients $\alpha_m$ and the frequencies $\omega_m$ of the signal to be detected and estimated are known to the base station.

The input signal, y(t), to the system 100 of FIG. 3 is the complex, baseband, T-sample taken from the timing and access interval. For simplicity, we again assume a single sample timing and access signal. The system 100 first takes N samples of the signal and computes an N-point Inverse Fast Fourier Transform (IFFT) in an IFFT element 102. The vector of IFFT components is denoted by Y. The vector Y is component-wise multiplied by vectors $\overline{A}_m$ using multipliers 103-m, m=1, 2, . . . S, and each product is passed through corresponding FFT magnitude elements 104-m to obtain the vectors, $$r_m = |FFT \text{of}(Y \cdot A_m)|^2, m=1, \ldots, S.$$

The vectors $\overline{A}_m$ are the complex conjugates of the IFFT vectors of certain multipath components of u(t), which are described below. The number, S, of multipath components is less than M, and will also be described below.

Let $r_{mk}$ be the k-th component of $r_m$, which represents the correlation of the m-th multipath component at a delay of k samples. The vectors $r_m$ are summed in element 106 to give the total power on all the multipath components. The system 100 estimates that the signal y(t) contains the synchronization signal u(t) if the maximum total power is sufficiently large. That is, the signal is detected if $$\max_{k=0,\ldots,N-1} \sum_{m=1}^{S} r_{mk} > C$$

where C>0 is an adjustable threshold. The maximum determination and thresholding process are implemented in elements 108 and 110, respectively. If the signal is detected, an estimate for the first arrival time of the signal is given by $$\hat{\tau} = \frac{T}{N} \left[ \underset{k=0,\ldots,N-1}{\text{argmax}} \sum_{m=1}^{S} r_{mk} \right]$$

As described above, the estimate $\hat{\tau}$ of the first arrival time locates the arrival times of the signal to the range $[\hat{\tau}, \hat{\tau}+\delta_{max}]$. With the range of arrival times estimated, the base station can send an appropriate timing correction to the mobile.

The multipath component vectors $A_m$ can be pre-computed as follows. Define the MxM matrix, R, whose k,l-th component is given by $$R_{k,l} := \int_0^{\delta_{max}} p(\tau) e^{j(\omega_k - \omega_l)\tau} a_k \overline{a}_l d\tau \qquad (6)$$

Also, define the matrix $$Q := I - (I + \gamma^2 R)^{-1} \qquad (7)$$

where $\gamma > 0$ is an adjustable parameter depending on the expected signal to noise ratio. Let $\sigma_m$ for m=1, . . . , S be the S largest eigenvalues of Q, and $U_m$ be the corresponding eigenvectors. Then the multipath component vector $A_m$ is the N-dimensional vector whose l-th component is given by $$A_{m,l} = \begin{cases} \delta_m U_{m,k} & \text{if } l = n_k \\ 0 & \text{else} \end{cases}$$

where $n_k$ is the index number of the k-th tone in multitone signal in (1), and $U_{m,k}$ is the k-th component of the M-dimensional vector $U_m$. The number S of eigenvectors used in the algorithm is adjustable. Using a larger number S of eigenvectors improves the estimation accuracy but increases the number of FFT units in the implementation.

Timing Tracking

The description thus far has considered timing estimation from a single synchronization measurement. However, under normal conditions, timing errors do not change significantly between successive re-synchronizations. Consequently, timing estimation can be improved by combining timing error estimates from different re-synchronizations.

A simple technique to combine successive timing error estimates is for the mobile to linearly low-pass filter the timing corrections from the base station, and use the filtered correction to adjust the transmit clock. Filtering the timing error estimates averages out the random estimation errors from the different estimates.

Figure 4:
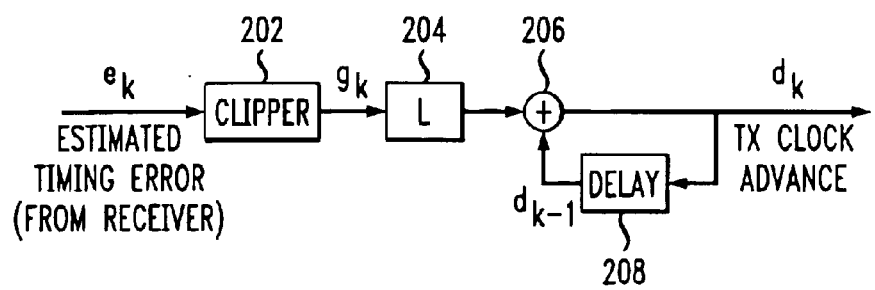
FIG. 4 shows an illustrative embodiment of a mobile station clock offset adjustment system with filtering in accordance with the invention.

FIG. 4 shows one possible implementation of a filtering clock offset adjustment system 200 that resides at a mobile. The input $e_k$ to the system 200 of FIG. 4 is the timing error estimate from the k-th synchronization in the mobile receiver. The timing error estimate is performed at the base station and is transmitted to the mobile in the downlink. The output of the system 200 is the transmit (TX) clock advance $d_k$, which is the time offset the mobile applies to its transmit clock in order for the mobile's uplink to arrive at the correct time at the base station.

The estimated timing error $e_k$ is first passed through a clipper 202 to screen out large values, which are likely to have occurred either due to a poor timing error measurement at the receiver, or a corruption of the feedback signal. One example implementation for the clipper 202 is $$g_k = \begin{cases} e_k & \text{if } |e_k| \leq M, \\ 0 & \text{else} \end{cases}$$

where M is an adjustable threshold. A more sophisticated clipper 202 may be of the form $$g_k = \begin{cases} e_k & \text{if } |e_k| \leq M, \text{ or if } |e_k| > M, |e_{k-l}| > M, \ldots, |e_{k-r}| > M \\ 0 & \text{else} \end{cases}$$

In this example, the signal $e_k$ is not clipped if the last r+1 values have all been greater than the threshold M.

After clipping, the clipped tracking error $g_k$ is passed through a standard integrating tracking loop comprising element 204 with static gain L, summing element 206, and feedback delay element 208 as shown. The gain $L \in [0,1]$ of element 204 can be adjusted to trade response time versus noise filtering.

Example Design

A simple example will now be provided to illustrate the design procedures described above. Consider an OFDM system having the parameters shown in Table 1. The parameters are based on an outdoor cellular wireless system with voice traffic. We assume a symbol period of $T_{SYM}=100\ \mu s$, which provides a symbol rate of 10 ksymbols per second. With quaternary phase shift keying (QPSK) modulation, this rate is adequate to support, on single tone, a standard voice coding rate of 9.6 kbps with rate ½ coding. The maximum delay spread assumption of $\delta_{max}=5\ \mu s$ would cover worst-case channels in non-mountainous terrain. The cyclic prefix of 15 $\mu s$ allows for the 5 $\mu s$ delay spread along with timing errors of +/−5 $\mu s$. The fundamental tone period is $T=T_{SYM}-T_{CP}=85\ \mu s$, and the tone spacing is 1/T=12.5 kHz. A standard bandwidth allocation of 5 MHz, fits $N_1=380$ tones with 5% excess bandwidth. To support FFT processing, which requires a number of tones equal to a power of two, we assume for this example that the sample window is sampled at N=512 points, but the ton 132 tones are not used.

To align the sample window and adjust the guard times, we also need to make some assumptions on the timing errors. We will assume for this example that the timing error, $\Delta$, between the signal arrival time and the beginning of the base station timing and access interval is bounded, $\Delta \in [\Delta_{min}, \Delta_{max}]$, with the values of $\Delta_{min}$ and $\Delta_{max}$ shown in Table 1. As mentioned previously, timing estimates with T-periodic multitone signals are ambiguous up to multiples of T. Thus, it is necessary that $\Delta_{max}-\Delta_{min} < T$ for the timing error $\Delta$ to be estimated unambiguously. Different timing bounds are assumed for the timing re-synchronization and access signals. For access signals, the timing error is the round-trip propagation time between the base station and mobile. The timing error bound of $[0,70\ \mu s]$ allows for cell radii of up to 10.5 km. For re-synchronization signals, the timing error is the error just before re-synchronization. Assuming the mobile is synchronized within the cyclic prefix before re-synchronizing, the maximum timing error could be +/−15 $\mu s$. For safety, a slightly larger range of +/−20 $\mu s$ is assumed in Table 1.

Figure 5:
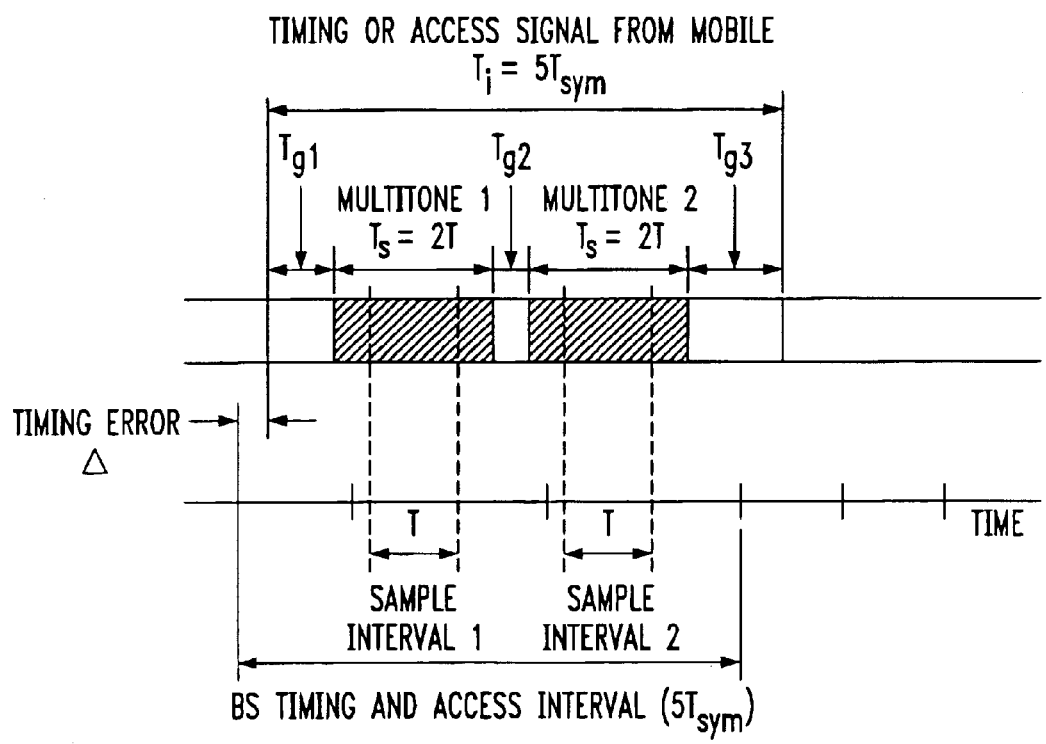
FIG. 5 shows a timing and access signal for an example design in accordance with the invention.

FIG. 5 shows multiple sample signal design for the above-described system. The marks on the time axis indicate the boundaries between the OFDM symbol periods at the base station. It is convenient to use a timing and access interval with an integer number of OFDM symbol periods, and for illustration, we have assumed in this example a timing and access interval S symbols, or 500 $\mu s$, in length. The number of multitone components in the signals depends on the peak power available at the mobile. For illustration, we have assumed a timing and access signals have L=2 multitone components.

The base station takes one T-period sample from each of the 2 multitone components. To synchronize the sampling of the timing and access signals with the sampling of data signals, the sampling is taken from the last T seconds of the $T_{SYM}$ length symbol periods. The first multitone component is sampled by the base station in the second symbol of the five-symbol timing and access interval, and the second component is sampled in the fourth symbol.

The multitone components are each $T_s=2T=170\ \mu s$ long which allows the maximum range in the timing error, $\Delta$. The guard periods, $T_{g1}$, $T_{g2}$ and $T_{g3}$ shown in Table 1 insure that for all timing errors, $\Delta \in [\Delta_{min}, \Delta_{max}]$, exactly one T-period of each of the two multitone signals falls within the correct sample period. Also, for all timing errors, the multitone signal components will always be received within the timing and access interval.

TABLE 1

Parameters for Example Design

| Symbol | Value | Description |
|---|---|---|
| N | 512 | Number of tones |
| $N_1$ | 380 | Number of tones utilized |
| T | 85 $\mu s$ | Fundamental tone period |
| $T_{SYM}$ | 100 $\mu s$ | OFDM symbol period |
| $T_{CP}$ | 15 $\mu s$ | Cyclic prefix length ($T_{SYM} - T$) |
| $\delta_{max}$ | 5 $\mu s$ | Maximum delay spread |
| $\Delta_{min}$ | 0 $\mu s$ (access) −20 $\mu s$ (resync) | Minimum timing error |
| $\Delta_{max}$ | 70 $\mu s$ (access) 20 $\mu s$ (resync) | Maximum timing error |
| $T_i$ | 500 $\mu s$ | Timing and access signal length |
| L | 2 | Number of multitone signals per timing and access signal |
| $T_s$ | 170 $\mu s$ | Multitone signal length |
| $T_{g1}$ | 30 $\mu s$ (access) 50 $\mu s$ (resync) | Initial guard period |
| $T_{g2}$ | 30 $\mu s$ | Guard period between multitone signals |
| $T_{g3}$ | 100 $\mu s$ (access) 80 $\mu s$ (resync) | Final guard period |
| M | 16 | Number of tones per multitone signal |
| $N_{SIG}$ | 23 | Number of timing and access signals |

The number of tones used in each multitone signal depends on the transmit power available at the mobile, the desired timing resolution, and the number of timing and access signals available in each interval. By way of example, we will consider a multitone signal design with M=16 tones in each multitone signal, giving a total of 32 tones over the entire timing and access signal. With 380 tones available for each multitone signal, we can construct $N_{SIG}$=23 timing and access signals with mutually non-overlapping sets of tones. The 23 signals can be divided between the signals for timing re-synchronization and signals for access, depending on system requirements.

Various options are available to allocate the tones among the 23 timing and access signals. To use the FIR design technique described above, we could allocate each of the timing and access signals LM=32 contiguous tones, sending 16 of the tones in each of the two multitone signals. However, for frequency diversity, it is preferable to split the tones, e.g., into two contiguous groups of 16 tones each, with the tone groups spaced far apart. The first group of 16 tones could be transmitted in the first multitone signal and the second group in the second multitone signal. For the remainder of this design example, we will assume the k-th timing and access signal, k=1 , . . . ,23, uses tone numbers 16(k−1) to 16k−1 for the first multitone signal, and tone numbers 16(l−1) to 16l−1 l=(k+12) mod 23 in the second multitone signal.

With this tone allocation, all the multitone signals have the same relative tone placing. Therefore, it is natural to use the same tone coefficients, $\alpha_m$, m=1, . . . , M, for all the signals. Table 2 shows a possible set of tone coefficients derived based on the optimization procedure described above. The coefficient magnitudes were selected using the Chebychev polynomial to solve the optimization problem (3) with δ=T/M. The coefficient phases were selected to minimize the peak-to-average ration (PAR) using the optimization (5). For the PAR optimization problem, we used an iterative random search technique which begins with a random initial point and then attempts to improve the variables with random step directions. After 100 runs of the algorithm, we obtained a minimum PAR of 1.38 which is close to the lower bound PAR>1.

TABLE 2

Multitone Signal Coefficients for Example Design

| Coefficient | Value |
| --- | --- |
| $a_1$ | −0.2193 − 0.1440i |
| $a_2$ | −0.1248 − 0.1540i |
| $a_3$ | −0.2154 − 0.0435i |
| $a_4$ | −0.0698 − 0.2279i |
| $a_5$ | 0.2537 − 0.0022i |
| $a_6$ | −0.2512 + 0.0860i |
| $a_7$ | −0.2547 + 0.0999i |
| $a_8$ | −0.2692 + 0.0680i |
| $a_9$ | 0.2151 + 0.1755i |
| $a_{10}$ | 0.2723 − 0.0267i |
| $a_{11}$ | −0.0051 + 0.2655i |
| $a_{12}$ | −0.0051 + 0.2655i |
| $a_{13}$ | 0.1841 − 0.1541i |
| $a_{14}$ | −0.1875 − 0.1145i |
| $a_{15}$ | 0.1950 − 0.0356i |
| $a_{16}$ | 0.0597 + 0.2555i |

As previously noted, the estimation and detection section above only considered single sample signals. However, estimation and detection for multiple sample signals can be treated identically by measuring the received values on the 16 tones in each of the two multitone signals, and then treating the total 32 values as if they were measured at the same time. This coherent combining is valid provided the channel does not change significantly over 200 μs between the first and second sample.

Using coherent estimation, we can derive the ML multipath timing estimator by constructing the 32×32 matrices R and Q given in equations (6) and (7), respectively. If we assume a uniform multipath profile, $p(\tau)=1/\delta_{max}$ for $\tau \in [0, \delta_{max}]$, then it can be verified that only 4 of the 32 eigenvalues of the matrix Q are non-negligible. Thus, the ML estimator can be implemented well with just S=4 multipath correlations.

The above-described embodiments are illustrative only. In addition, the assumptions made above with regard to the description of the illustrative embodiments are for purposes of simplicity and clarity of illustration, and are not intended to limit the scope of the invention. The invention can of course be implemented in systems in which these assumptions do not apply. Furthermore, many different types, arrangements and configurations of processing elements other than those described herein may be used to implement the invention. These and other alternative embodiments within the scope of the appended claims will be readily apparent to those skilled in the art.

What is claimed is:

1. A method for use in a wireless communication system, comprising the step of:

transmitting at least one of an uplink access signal and an uplink timing synchronization signal from a mobile station of the system to a base station of the system, wherein the at least one signal is from a signal set which includes a plurality of orthogonal signals, such that different timing and access signals from the mobile station and at least one other mobile station of the system are received at the base station orthogonal to one another over a base station sample window.

2. The method of claim 1 wherein the wireless system comprises an orthogonal frequency division multiplexed (OFDM) system.

3. The method of claim 1 wherein the signal set comprises a plurality of multitone signals, each of at least a subset of the multitone signals comprising a linear combination of tones whose baseband frequencies are integer multiples of 1/T, where T is the base station sample window size.

4. The method of claim 3 wherein the sample window size T for the timing and access signals is the same as that used in the system for OFDM data symbols.

5. The method of claim 1 wherein each timing and access signal comprises a single multitone signal with different signals using non-overlapping subsets of tones, and further wherein the tones from all of the timing and access signals span the total available bandwidth.

6. The method of claim 5 wherein the multitone signals are transmitted with a cyclic prefix sufficiently large to cover multipath dispersion and pre-synchronization timing errors.

7. The method of claim 6 wherein the cyclic prefix is larger than a cyclic prefix used in data symbols transmitted from mobile stations that are already synchronized.

8. The method of claim 1 wherein a guard time of non-transmission is added to at least one of a beginning or an end of at least one of the timing and access signals to insure that the signal does not overrun into adjacent data symbols.

9. The method of claim 1 wherein during a particular timing and access interval, the base station takes a single T-length sample of a multitone timing and access signal, where T is the base station sample window size.

10. The method of claim 1 wherein the base station sample window is located within a designated timing and access interval, such that, for all possible multipath signal arrival times, the sample window captures one T-period of the steady-state sinusoidal response to the multitone signal, where T is the base station sample window size.

11. The method of claim 1 wherein a base station timing and access sample window is synchronized with a data sample window of the base station.

12. The method of claim 1 wherein the mobile station computes a multitone timing and access signal using an inverse fast Fourier transform (IFFT) that is also used for data transmission.

13. The method of claim 1 wherein the mobile station pre-computes a multitone timing and access signal and stores it in a memory associated with the mobile station.

14. The method of claim 1 wherein each of at least a subset of the timing and access signals comprises a sequence of L multitone signals transmitted sequentially, with different timing and access signals using non-overlapping subsets of tones in each of L sample windows, and further wherein the base station takes a T-length sample from each of the L multitone signals, where T is the base station sample window size.

15. The method of claim 1 wherein at least a subset of the timing and access signals comprise multitone signals, and the coefficients of a given multitone signal are selected such that a cyclic autocorrelation of the signal at delays greater than a desired timing accuracy is sufficiently small.

16. The method of claim 1 wherein at least a subset of the timing and access signals comprise multitone signals, with a given multitone signal comprising contiguous tones, such that coefficient selection for the given multitone signal can be performed using a finite impulse response (FIR) filter design procedure.

17. The method of claim 16 wherein the FIR filter design procedure comprises a Chebychev polynomial design procedure.

18. The method of claim 1 wherein at least a subset of the timing and access signals comprise multitone signals, and wherein the tone frequencies of a given one of the multitone signals are spread throughout a designated frequency spectrum for purposes of frequency diversity.

19. The method of claim 18 wherein the given multitone signal comprises groups of contiguous tones, with the groups of tones separated by an amount greater than a channel coherence bandwidth.

20. The method of claim 1 wherein at least a subset of the timing and access signals comprise multitone signals, and wherein the coefficients of a given one of the multitone signals are selected such that a peak-to-average ratio of the signal is minimized.

21. The method of claim 1 wherein when the mobile station transmits a timing or access signal u(t), the base station uses a maximum-likelihood (ML) estimator on the received signal y(t) to estimate an appropriate timing correction.

22. The method of claim 21 wherein in a multipath channel, the ML estimate is the time $\tau$ which maximizes the sum of the cross-correlation energies of y(t) with certain multipath components of u(t).

23. The method of claim 22 wherein the multipath components of u(t) are given as the eigenvectors of an average auto-correlation of the received signal, where the average is taken over the randomness in the multipath channel and the signal noise.

24. The method of claim 22 wherein the multipath components depend only on u(t) and can be pre-computed and stored by the base station.

25. The method of claim 22 wherein each cross-correlation of y(t) with a multipath component can be computed using a single inverse fast Fourier transform (IFFT).

26. The method of claim 1 wherein received signal power can be estimated in the base station by a measure of maximum total cross-correlation energy.

27. The method of claim 1 wherein the presence of a transmitted access signal u(t) can be detected by the base station when estimated received signal power surpasses a pre-determined energy threshold.

28. The method of claim 27 wherein the threshold can be adjusted to trade off false access detection probability and missed detection probability.

29. The method of claim 27 wherein the threshold can be increased to ensure that access signals are received with sufficient energy to allow accurate timing estimates.

30. The method of claim 1 wherein when re-synchronizations are sufficiently frequent, the mobile station can combine timing corrections obtained from different re-synchronization intervals to average out timing estimation errors.

31. The method of claim 30 wherein the combining can be performed by linearly low-pass filtering timing estimates received from the base station.

32. The method of claim 1 wherein the mobile station is operative to clip timing corrections received from the base station.

33. The method of claim 32 wherein the mobile station clips the corrections by ignoring timing corrections greater than a threshold.

34. The method of claim 32 wherein the mobile station clips the corrections by accepting a timing correction which is larger than a threshold only if a certain number of large values are received in succession.

35. A mobile station system for use in a wireless communication system, the mobile station system being operative to transmit at least one of an uplink access signal and an uplink timing synchronization signal from a corresponding mobile station of the system to a base station of the system, wherein the at least one signal is from a signal set which includes a plurality of orthogonal signals, such that different timing and access signals from the mobile station and at least one other mobile station of the system are received at the base station orthogonal to one another over a base station sample window.

36. An apparatus for use in a wireless communication system, the apparatus comprising:
   means for transmitting at least one of an uplink access signal and an uplink timing synchronization signal from a mobile station of the system to a base station of the system, wherein the at least one signal is from a signal set which includes a plurality of orthogonal signals, such that different timing and access signals from the mobile station and at least one other mobile station of the system are received at the base station orthogonal to one another over a base station sample window; and
   means for generating the at least one signal to be transmitted.

37. A method for use in a wireless communication system, comprising the step of:
   receiving at least one of an uplink access signal and an uplink timing synchronization signal in a base station of the system from a mobile station of the system, wherein the at least one signal is from a signal set which includes a plurality of orthogonal signals, such that different timing and access signals from the mobile station and at least one other mobile station of the system are received at the base station orthogonal to one another over a base station sample window.

38. An apparatus for use in a wireless communication system, the apparatus comprising:

means for receiving at least one of an uplink access signal and an uplink timing synchronization signal in a base station of the system from a mobile station of the system, wherein the at least one signal is from a signal set which includes a plurality of orthogonal signals, such that different timing and access signals from the mobile station and at least one other mobile station of the system are received at the base station orthogonal to one another over a base station sample window; and means for processing the received at least one signal.

39. A base station system for use in a wireless communication system, the base station system being operative to receive at least one of an uplink access signal and an uplink timing synchronization signal from a mobile station of the system, wherein the at least one signal is from a signal set which includes a plurality of orthogonal signals, such that different timing and access signals from the mobile station and at least one other mobile station of the system are received at a corresponding base station orthogonal to one another over a base station sample window.

* * * * *